(12) United States Patent
Ueda (10) Patent No.: US 11,370,395 B2
(45) Date of Patent: Jun. 28, 2022

(54) ADHERING SUBSTANCE REMOVING DEVICE

(71) Applicant: SUBARU CORPORATION, Tokyo (JP)

(72) Inventor: Tomohisa Ueda, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 234 days.

(21) Appl. No.: 16/732,920

(22) Filed: Jan. 2, 2020

(65) Prior Publication Data

US 2020/0307522 A1 Oct. 1, 2020

(30) Foreign Application Priority Data

Mar. 26, 2019 (JP) .............................. JP2019-058474

(51) Int. Cl.
*B60S 1/48* (2006.01)
*B08B 7/02* (2006.01)

(52) U.S. Cl.
CPC .............. *B60S 1/486* (2013.01); *B08B 7/028* (2013.01); *B60S 1/485* (2013.01)

(58) Field of Classification Search
CPC .................................... B60S 1/48; B60S 1/486
See application file for complete search history.

(56) References Cited

U.S. PATENT DOCUMENTS

| 5,418,643 A | 5/1995 | Ogasawara et al. |
| 2010/0244341 A1* | 9/2010 | Nemoto ................ F16F 13/268 267/140.14 |
| 2014/0371967 A1* | 12/2014 | Miwa .................... B60W 30/20 701/22 |

FOREIGN PATENT DOCUMENTS

| JP | H 05-24464 U | 3/1993 |
| JP | 2500186 Y2 | 6/1996 |
| JP | 2502299 Y2 | 6/1996 |
| JP | H08-268232 A | 10/1996 |
| JP | 2558994 Y2 | 1/1998 |

* cited by examiner

*Primary Examiner* — Michael D Jennings
(74) *Attorney, Agent, or Firm* — McGinn I.P. Law Group, PLLC.

(57) ABSTRACT

An adhering substance removing device is configured to remove adhering substances on an exterior member of a vehicle body. The device includes a vibration generator and a vibration transmitting member. The vibration generator is configured to generate vibrations. The vibration transmitting member includes a first surface and a second surface. The first surface faces the exterior member. The second surface is inclined with an acute angle relative to the first surface. The vibration generator is mounted on the second surface. The vibration transmitting member is softer than the exterior member. The vibration transmitting member is configured to generate surface waves that advance in a predetermined direction in the exterior member.

17 Claims, 5 Drawing Sheets

ADHERING SUBSTANCE REMOVING DEVICE

CROSS-REFERENCE TO RELATED APPLICATIONS

The present application claims priority from Japanese Patent Application No. 2019-058474 filed on Mar. 26, 2019 the entire contents of which are hereby incorporated by reference.

BACKGROUND

The disclosure relates to an adhering substance removing device that removes adhering substances on an exterior member of a vehicle.

With regard to a vehicle, such as an automobile, a technique for removing water drops and dirt by means of ultrasonic vibrations has been developed. Water drops and dirt may adhere to components such as a window glass or a mirror.

One of existing techniques using vibration for repelling water and foreign substances is disclosed in Japanese Utility Model Registration (JP-U) No. 2502299, for example. JP-U No. 2502299 discloses a mirror with a water drop removing function. The mirror body receives vibrations from an ultrasonic vibrator and has a circumferential portion hydrophilized so as to retain water drops.

JP-U No. 2558994 discloses a mirror that is removable of water drops by means of ultrasonic waves. This mirror has an ultrasonic vibration device that is incorporated between the mirror and a back side holding plate. The mirror is able to retain moisture at a circumferential portion.

Japanese Unexamined Patent Application Publication No. 8-268232 discloses a water drop removing device for a vehicle window. The water drop removing device includes a piezoelectric vibrator that is provided on a vehicle body frame around a water-repellent window glass. The piezoelectric vibrator vibrates this window glass to drop down water drops during traveling in a rainy weather.

Japanese Unexamined Utility Model (Registration) Application Publication No. 5-24464 discloses a windshield frame to which a window glass is fitted. The windshield frame is made of rubber mixed with a conductive material and a piezoelectric material. A power source is applied to the windshield frame to make it ultrasonically vibrate, whereby water drops and dirt adhering to the window glass are removed.

JP-U No. 2500186 discloses a technique of forming a hydrophilic part at a water receiving part provided at a glass end part, in order to prevent water collected by a wiper device from flowing out from a windshield glass to a side window glass side. The hydrophilic part includes a component such as a wick uneven part, a flocked part, a mesh adhering part, or a hydrophilic substance layer.

SUMMARY

An aspect of the disclosure provides an adhering substance removing device. The device is configured to remove adhering substances on an exterior member of a vehicle body. The device includes a vibration generator and a vibration transmitting member. The vibration generator is configured to generate vibrations. The vibration transmitting member includes a first surface and a second surface. The first surface faces the exterior member. The second surface is inclined with an acute angle relative to the first surface. The vibration generator is mounted on the second surface. The vibration transmitting member is softer than the exterior member. The vibration transmitting member is configured to generate surface waves that advance in a predetermined direction in the exterior member.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

As in the existing techniques described above, in order to remove water drops on the entire surface of a component such as a window glass by uniformly vibrating the component, a vibrating device tends to have a large-scale configuration and to consume a large amount of electricity.

On the other hand, in a typical automobile, which has a movable glass that is raised and lowered relative to a door, such as a door glass, water drops and dirt adhering to the movable glass are removed as follows. In one example, a user or a driver wipes water drops and dirt away by hand with a wiping cloth or other tool. In another example, water drops and dirt adhering to the glass surface are dragged at a door outer molding by raising or lowering the movable glass.

However, it is difficult to wipe water drops and dirt by hand during traveling. In addition, it is also difficult to appropriately clean a desired range unless the wiping is performed from outside of the vehicle.

In the case of using a door outer molding to drag water drops and dirt, removing water drops and dirt thoroughly is highly difficult.

In view of these circumstances, it is desired to develop a technique that enables effective removal of adhering substances on a specific part such as a glass by a relatively small-scale device configuration.

It is desirable to provide an adhering substance removing device for effectively removing adhering substances on a specific region of an exterior member of a vehicle.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

A description will be hereinafter made on an adhering substance removing device according to a first embodiment of the disclosure.

The adhering substance removing device of the first embodiment is configured to remove water drops and other adhering substances, for example, on a side door glass of an automobile, such as a passenger vehicle.

In the first embodiment, the vehicle is, for example, a generally called "two-box" vehicle or "three-box" vehicle, in which an engine room is provided at the front of a vehicle cabin.

Figure 1:
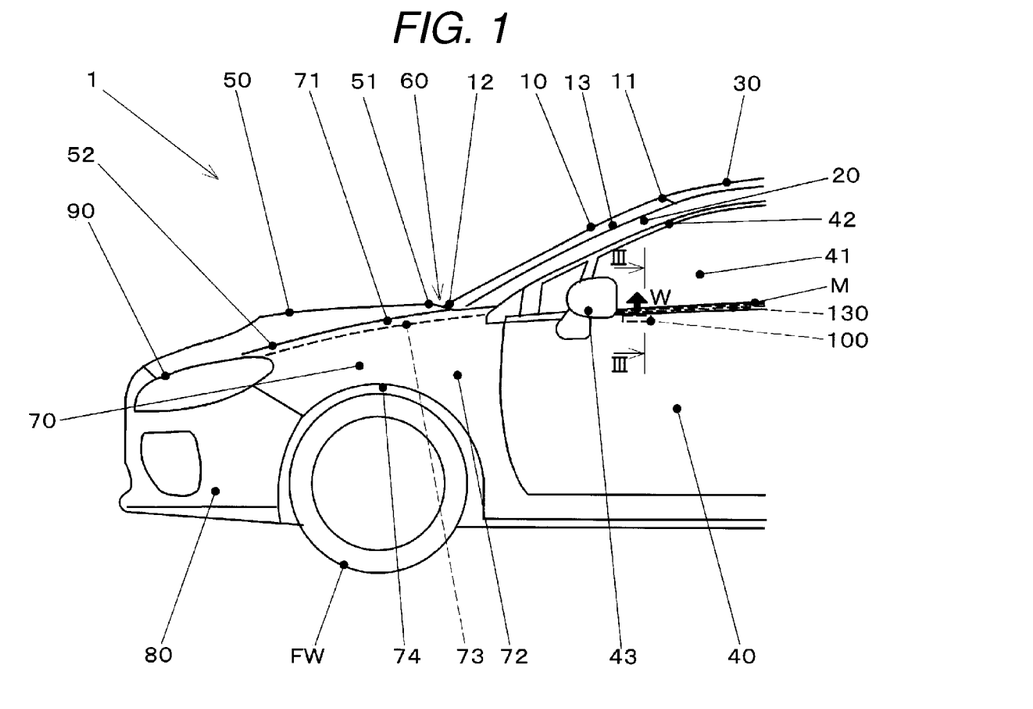
FIG. 1 is a schematic side view of a front part of a vehicle body of a vehicle having an adhering substance removing device according to a first embodiment of the disclosure.

FIG. 1 is a schematic side view of a front part of a vehicle body of a vehicle 1 having the adhering substance removing device of the first embodiment.

The vehicle 1 includes a windshield glass 10, a front pillar 20, a roof 30, a front door 40, a hood 50, a cowl 60, a fender 70, a bumper face 80, a front combination lamp 90, and an adhering substance removing device 100.

The windshield glass 10 is a window glass or in other words, a windshield or a windscreen, provided at the front of the vehicle cabin.

The windshield glass 10 is formed into an approximately rectangular shape and is inclined rearward such that an upper end 11 is closer to the vehicle rear side than a lower end 12.

The lower end 12 is formed into a curve shape with a convex toward the vehicle front side in a plane view.

The windshield glass 10 has a side end 13 that is disposed along the front pillar 20.

The windshield glass 10 is a laminated glass with a quadric surface that is formed by curving or rounding a vehicle front side so as to be convex toward the vehicle front side.

The front pillar 20, which may also be called an "A" pillar, is a vehicle body structural member extending along the side end 13 of the windshield glass 10.

The front pillar 20 has a lower edge that is adjacent to a door sash 42 formed around a front door glass 41 above the front door 40.

The roof 30 is a panel-shaped member constituting an upper surface portion of the vehicle cabin.

The roof 30 extends from the upper end 11 of the windshield glass 10 toward the vehicle rear side.

The front door 40 is a hinged door provided at a side surface portion at the front part of the vehicle cabin.

The front door 40 opens and closes by swinging around a hinge provided at a front end. The hinge is not illustrated in the drawing.

The front door 40 includes the front door glass 41, the door sash 42, and a side mirror 43.

The front door glass 41 is provided above the front door 40.

The front door glass 41 is a movable glass that can be raised and lowered relative to the front door 40.

The door sash 42 is a frame for holding the front door glass 41 and is formed along a front edge and an upper edge of the front door glass 41.

A front edge of the door sash 42 is disposed along the front pillar 20. An upper edge of the door sash 42 is disposed along a roof side frame provided at a side end of the roof 30.

The door sash 42 is provided with a weather strip that is a water-proof member for preventing entering of rainwater into the vehicle cabin. The weather strip is not illustrated in the drawing.

The side mirror 43 is a rearward checking device provided in a region of an upper front part of an outer panel that constitutes an exterior surface of a main body of the front door 40.

The side mirror 43 is supported by a stay protruding from the outer panel.

The side mirror 43 includes a mirror body, an angle adjuster, a retractable folding mechanism, and other components that are housed in a housing.

The hood 50 is an exterior member that covers an upper part of the engine room. The hood 50 is an openable cover.

The hood 50 is formed into a substantially rectangular shape in a plane view of the vehicle. The hood 50 is obliquely disposed such that a front end is slightly lower than a rear end. This oblique angle is smaller than the oblique angle of the windshield glass 10.

The hood 50 opens and closes by swinging in a direction in which the front end is raised and lowered around a hinge provided on the rear end.

The hood 50 has a rear edge 51 that is disposed in front of the lower end 12 of the windshield glass 10, with a gap from the lower end 12 in the vehicle front-rear direction.

The rear edge 51 is formed into a curve shape with a convex on the vehicle front side in a plane view.

The hood 50 has a side edge 52 that is adjacent to an edge on an inner side in the vehicle width direction of the upper surface portion 71 of the fender 70, via an inevitable gap.

The cowl 60 is a recess that is recessed downward relative to the surface of the hood 50. The recess is provided in a region in rear of the rear edge 51 of the hood 50 and in front of the lower end 12 of the windshield glass 10.

The cowl 60 includes a wiper arm and other components that are housed in a cowl top panel. For example, the cowl top panel is made of a resin material and is formed into a tray shape with a downward recess.

A side end in the vehicle width direction of the cowl 60 is adjacent to a region in the vicinity of a rear end of the upper surface portion 71 of the fender 70.

The fender 70 is an exterior member of the vehicle, constituting a side surface portion of the engine room.

The fender 70 includes the upper surface portion 71 and a side surface portion 72.

The upper surface portion 71 is a region adjacent to the side edge 52 of the hood 50 and to a side end of the cowl 60. The upper surface portion 71 is formed approximately along a curve surface that is extended outwardly in the vehicle width direction from a curve surface forming a surface portion of the hood 50.

The side surface portion 72 extends downward from the vicinity of an end on the outside in the vehicle width direction of the upper surface portion 71.

The side surface portion 72 is formed into a moderately curve surface convexed toward the outside of the vehicle body.

A boundary between the upper surface portion 71 and the side surface portion 72 includes inflection points 73 that are continuously formed in the vehicle front-rear direction. The inflection points 73, at which a curvature of the curve surface is locally large, form what is called a ridge line or a bent line, of the fender 70.

In addition, the side surface portion 72 includes an opening 74 of a wheel house for housing a front wheel FW.

The bumper face 80 is a resin exterior member that is provided at a lower part of a front end of the vehicle.

The bumper face 80 is provided in front of the opening 74 of the fender 70.

The front combination lamp 90 includes various lamps, such as a headlamp, a side-marker lamp, and a turn-signal lamp. These lamps are housed in the same housing to form a unit.

The front combination lamp 90 is disposed under the hood 50 and above the bumper face 80 at the front end of the vehicle.

The adhering substance removing device 100 vibrates the front door glass 41 and generates surface waves that advance while having directivity.

Figure 2:
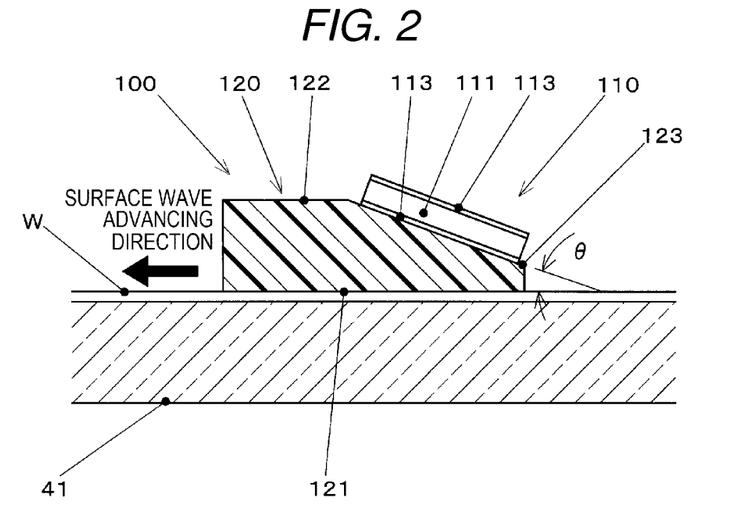
FIG. 2 is a schematic sectional view of the adhering substance removing device of the first embodiment.

FIG. 2 is a schematic sectional view of the adhering substance removing device 100 of the first embodiment.

The adhering substance removing device 100 includes a vibration generator 110 and a vibration transmitting member 120.

The vibration generator 110 is a piezoelectric element or a piezo element that includes a piezoelectric body 111 held between a pair of electrodes 113. The piezoelectric body 111 is made of polycrystalline ferroelectric ceramic, such as lead zirconate titanate (PZT).

The vibration generator 110 generates vibrations in response to application of AC voltage to the electrodes 113.

The vibration transmitting member 120 transmits vibrations, which are generated by the vibration generator 110, to the front door glass 41 to generate surface waves that advance along the surface of the front door glass 41.

The vibration transmitting member 120 is formed into a block shape and includes a vibration applying surface portion 121, an outer surface portion 122, and an input surface portion 123.

In some embodiments, the vibration transmitting member 120 is made of a material that does not greatly damp vibrations, which are transmitted from the vibration generator 110, and that is softer than the glass material of the front door glass 41. For example, the vibration transmitting member 120 may be formed as one body by using a resin material or other material, which is softer than a glass material, such as polyphenylene sulfide resin.

The vibration applying surface portion 121 has a substantially flat shape and faces the surface of the front door glass 41 via a minute gap. In one embodiment, the vibration applying surface portion 121 may serve as a "first surface".

The gap between the vibration applying surface portion 121 and the front door glass 41 is set, for example, so as to be able to retain water by surface tension.

The outer surface portion 122 is on a side opposite to the vibration applying surface portion 121. The outer surface portion 122 is formed into a flat shape while being substantially in parallel to the vibration applying surface portion 121.

The input surface portion 123 is attached with the vibration generator 110 and receives vibrations generated by the vibration generator 110. In one embodiment, the input surface portion 123 may serve as a "second surface".

The input surface portion 123 is a flat surface that is provided in a region in the vicinity of one end of the outer surface portion 122 while being inclined to be thinner to an edge.

The angle θ between the vibration applying surface portion 121 and the input surface portion 123 is set to be acute.

The vibration applying surface portion 121 of the vibration transmitting member 120 and the front door glass 41 are configured to have water W therebetween. The water W is supplied from a water retaining member 130, which will be described later.

In this state, when the vibration generator 110 is made to generate ultrasonic vibrations by applying AC voltage, the vibrations are transmitted to the front door glass 41 via the vibration transmitting member 120 and the water W.

At this time, surface waves are generated in the front door glass 41. The surface waves advance in a direction opposite to a side on which the input surface portion 123 of the vibration transmitting member 120 is provided, that is, the left side in FIG. 2, while having directivity.

In some embodiments, the wavelength of the surface wave is smaller than the sheet thickness of the front door glass 41, for example.

Figure 3:
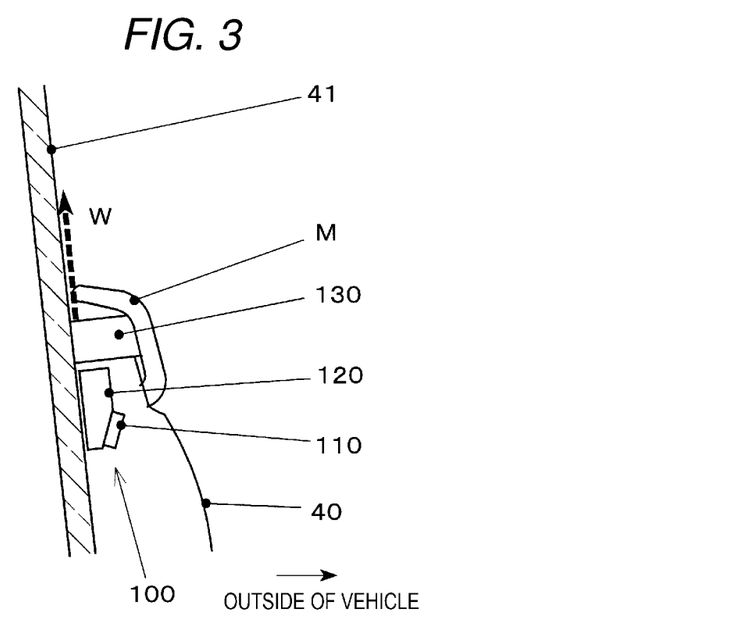
FIG. 3 is a schematic sectional view of the adhering substance removing device taken along a line III-III in FIG. 1.

FIG. 3 is a schematic sectional view of the adhering substance removing device 100 taken along a line III-III in FIG. 1.

The adhering substance removing device 100 is disposed in a region adjacent to a door outer molding M between the outer panel and the front door glass 41 above the front door 40, so that the advancing direction of the surface waves will be an upward direction.

The door outer molding M is disposed along an upper end portion of the outer panel of the front door 40. The door outer molding M includes a lip portion formed of a flexible and elastic material, such as rubber.

The water retaining member 130 is provided between the door outer molding M and the front door glass 41 and above the adhering substance removing device 100.

The water retaining member 130 includes, for example, a flocked portion. The water retaining member 130 has a function of retaining water in contact with the surface of the front door glass 41. The water comes flowing down along the surface of the front door glass 41. In one embodiment, the water retaining member 130 may serves as a "liquid retaining member".

Some of the water, which is retained by the water retaining member 130, flows immediately below to the adhering substance removing device 100 side and is supplied between the vibration applying surface portion 121 of the vibration transmitting member 120 and the surface of the front door glass 41.

In the first embodiment, when the vibration generator 110 is made to generate ultrasonic vibrations while the water retaining member 130 retains sufficient amount of water, surface waves that advance upwardly are generated in the front door glass 41. The generated surface waves make the water W ejected upwardly along the surface of the front door glass 41.

Some of the water is atomized into mist by the ultrasonic vibrations and is scattered by travel wind of the vehicle.

The flows of the water W, which are ejected along the front door glass 41, wash off adhering substances that adhere to a part of the front door glass 41, such as water drops and dirt. The part of the front door glass 41 is, for example, a region in rear of the side mirror 43 and corresponds to a field of view of the side mirror 43 that is viewed by a driver.

Energization or excitation of the vibration generator 110 may be turned on and off in response to operation by a driver, for example. In addition, energization may be performed in cooperation with detection of a poor weather condition, such as a rainy condition or a snow falling condition, or with a turn-on operation of a wiper device by a driver.

According to the first embodiment described above, the following effects are obtained.

(1) The vibration transmitting member 120, which has the vibration applying surface portion 121 and the input surface portion 123 with the predetermined acute angle θ, is excited by the vibration generator 110 having the piezoelectric body 111. This causes generation of surface waves that advance along a predetermined advancing direction while having a directivity, in the front door glass 41 that functions as the exterior member. The surface waves effectively remove local adhering substances at a specific part of the exterior member existing in the advancing direction of the surface waves.

(2) The water retaining member 130 is provided adjacent to the vibration generator 110 and the vibration transmitting member 120. This structure makes the water W, which is retained on the surface of the front door glass 41, be ejected out in the advancing direction of the surface waves in response to generation of the surface waves, thereby forming flows of water. The flows of water facilitate removal of adhering substances, such as dirt.

(3) Some of the water W is retained between the vibration transmitting member 120 and the front door glass 41 and functions as a medium that transmits vibrations from the vibration transmitting member 120 to the front door glass 41. The retained water W eliminates the need to bring the vibration transmitting member 120 into close contact with the front door glass 41. Thus, although the front door glass 41 is a movable glass that can be raised and lowered, vibrations are appropriately applied to the front door glass 41 without interrupting the movement of the front door glass 41.

(4) The vibration generator 110, the vibration transmitting member 120, and the water retaining member 130 are disposed inside the door outer molding M, which is provided on a circumferential portion of the front door glass 41. This configuration enables obtaining the effect for removing adhering substances on the front door glass 41 without reducing design performance of the vehicle.

(5) Since the water retaining member 130 is provided adjacent to the door outer molding M, the water retaining member 130 retains the water W that flows down to the door outer molding M along the surface of the front door glass 41 under a rainy weather. With this simple configuration, the above-described effects are obtained.

Moreover, raising and lowering the vibrated front door glass 41 removes adhering substances in a wide range of the front door glass 41.

(6) The vibration generator 110 includes the piezo element or the piezoelectric element. The vibration transmitting member 120 is made of a resin material or other material, which is softer than a glass material, such as polyphenylene sulfide resin. With this simple structure, the above-described effects are appropriately obtained.

Second Embodiment

Next, a description will be hereinafter made on the adhering substance removing device according to a second embodiment of the disclosure.

In each of the following embodiments, the components common to those in the foregoing embodiment are denoted by the same reference numerals and signs to omit duplicate description, and the differences will be mainly described.

Figure 4:
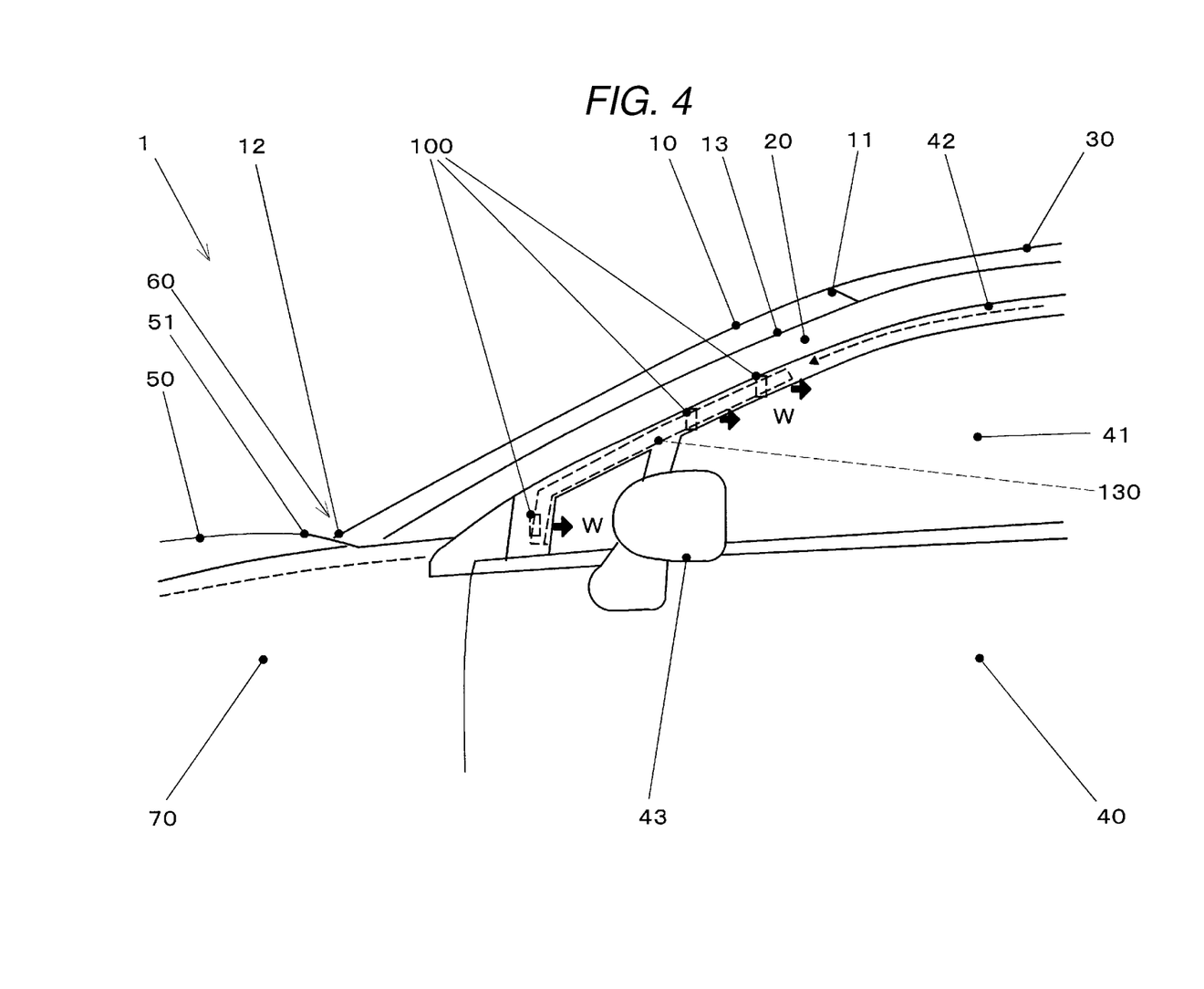
FIG. 4 is a schematic side view of a surrounding part of a front door glass of a vehicle having an adhering substance removing device according to a second embodiment of the disclosure.

FIG. 4 is a schematic side view of a surrounding part of the front door glass 41 of the vehicle 1 having the adhering substance removing device 100 of the second embodiment.

In the second embodiment, plural adhering substance removing devices 100 are disposed in a distributed state along a longitudinal direction of the door sash 42.

The water retaining member 130 is formed continuously in the region in which the plural adhering substance removing devices 100 are provided.

Each of the adhering substance removing devices 100 is disposed such that the advancing direction of the surface waves will be a vehicle rearward direction along the flowing direction of a generally called travel wind. The travel wind is generated by surrounding air that flows around the vehicle body during traveling of the vehicle.

The door sash 42 includes a water guide passage, which is not illustrated in the drawing. The water guide passage guides water that is captured in a region other than the region provided with the water retaining member 130, to the water retaining member 130 along the longitudinal direction of the door sash 42.

As described thus far, the second embodiment provides the following effects in addition to effects similar to those of the first embodiment, except for the effects described in (4) and (5).

(1) The door sash 42 is provided with the adhering substance removing devices 100 and the water guide passage. With this simple structure, water that gathers to a water-proof weather strip and a relevant part, which are normally provided on the door sash 42, is retained by the water retaining member 130, whereby the above-described effects are obtained.

(2) Supplying water from the region other than the region provided with the water retaining member 130 in the door sash 42 prevents a water shortage at the water retaining member 130. As a result, the above-described effects are reliably obtained.

(3) The advancing direction of the surface waves, which are generated by the adhering substance removing device 100, approximately coincides with the direction of the travel wind. The effect of both the surface waves and the travel wind for removing adhering substances work together, thereby generating further effective adhering substance removing effect.

Third Embodiment

Next, a description will be hereinafter made on the adhering substance removing device according to a third embodiment of the disclosure.

Figure 5:
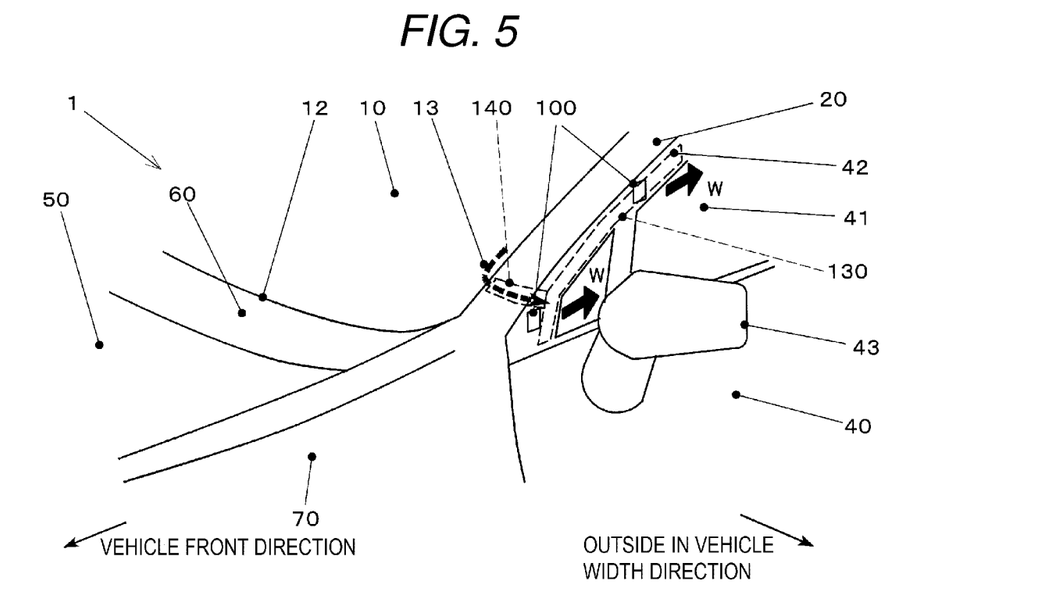
FIG. 5 is a schematic external perspective view of a surrounding part of an "A" pillar of a vehicle having an adhering substance removing device according to a third embodiment of the disclosure.

FIG. 5 is a schematic external perspective view of a surrounding part of the "A" pillar 20 of the vehicle 1 having the adhering substance removing device 100 of the third embodiment.

The adhering substance removing device 100 of the third embodiment further includes a water guide passage 140 described below, in addition to the configuration similar to that in the second embodiment.

The water guide passage 140 is provided within the "A" pillar 20 and guides water to the water retaining member 130, which is provided inside the door sash 42. The water is collected to the side end 13 of the windshield glass 10 by, for example, a wiper device or other device, which is not illustrated in the drawing.

In the third embodiment described above, water, which is collected to the side end 13 of the windshield glass 10, is supplied to the water retaining member 130. Thus, the third embodiment more reliably prevents a water shortage at the water retaining member 130 as well as providing effects similar to those of the second embodiment.

Modification Example

The above-described embodiments of the disclosure are not to be construed in a limiting sense, and various modifications and changes are possible and would also fall within the technical scope of the disclosure.

(1) The configurations of the adhering substance removing device and the vehicle mounted therewith are not limited to each of the embodiments, and they can be changed or modified as desired.

For example, the shape, the structure, the material, the manufacturing method, the number, and other factors of each component constituting the adhering substance removing device can be changed or modified as desired.

(2) The region of the vehicle body of the vehicle, in which the adhering substance removing device is provided, and the distribution position, the number, and other factors of the adhering substance removing device, are not limited to each of the forgoing embodiments and can be changed or modified as desired.

(3) In each of the embodiments, for example, a transparent member provided on a window of a vehicle is a front door glass. However, the embodiment of the disclosure is not limited thereto, and a resin material such as of polycarbonate system or acrylic system, or other transparent material, may be used as the transparent member. The window on which the adhering substance removing device is provided is not limited to the front door window that can be raised and lowered, and may be other window.

For example, in a vehicle having a fixed window at a base part of an "A" pillar or in front of a front door glass, such as a generally called quarter glass, the adhering substance removing device of the embodiment of the disclosure may be provided on a circumferential portion of a transparent member of a window.

(4) The liquid that is used by the adhering substance removing device is, for example, rainwater, in each of the embodiments. However, the liquid is not limited thereto, and other liquid can also be used.

For example, a washing liquid may be supplied from a tank or other unit. This liquid may be retained by the liquid retaining member of the adhering substance removing device and be ejected by means of surface waves.

According to the embodiment of the disclosure, the second surface is inclined so as to form the acute angle relative to the first surface that faces the exterior member, and the second surface is excited by the vibration generator. This causes generation of surface waves that advance along a predetermined advancing direction while having a directivity, in the exterior member. The surface waves effectively remove local adhering substances at a specific part of the exterior member existing in the advancing direction of the surface waves.

In these conditions, liquid, which is retained on the surface of the exterior member, is ejected out in the advancing direction of the surface waves in response to generation of the surface waves, thereby forming flows of liquid. The flows of liquid facilitate removal of adhering substances, such as dirt.

The liquid also functions as a medium that transmits vibrations from the vibration transmitting member to the exterior member. The liquid eliminates the need to bring the vibration transmitting member into close contact with the exterior member. Thus, for example, when the exterior member is movable, vibrations are appropriately applied without interrupting the movement of the exterior member.

The constitutional components of the adhering substance removing device are housed in the window frame. This configuration enables obtaining the effect for removing adhering substances on the transparent member such as the window glass, without reducing design performance of the vehicle.

Moreover, the liquid retaining member retains water that flows down to the door outer molding along the surface of the door window under a rainy weather. With this simple configuration, the above-described effects are obtained.

Moreover, elevating the vibrated door window removes adhering substances in a wide range of the door window.

Furthermore, water that gathers to a water-proof weather strip and a relevant part, which are normally provided on a sash part, is retained by the liquid retaining member. With this simple configuration, the above-described effects are obtained.

Supplying liquid from the region other than the region provided with the liquid retaining member in the sash prevents a water shortage at the liquid retaining member. As a result, the above-described effects are reliably obtained.

The effects of both the surface waves and the travel wind for removing adhering substances work together, thereby generating further effective adhering substance removing effect.

With such a simple structure, the above-described effects are appropriately obtained.

As described above, according to the embodiments of the disclosure, an adhering substance removing device for effectively removing adhering substances on a specific region of an exterior member of a vehicle is provided.

The invention claimed is:

1. An adhering substance removing device configured to remove an adhering substance substances on an exterior member of a vehicle body, the adhering substance removing device comprising: a vibration generator configured to generate vibrations; and a vibration transmitting member comprising a first surface and a second surface, the first surface facing the exterior member, the second surface being inclined with an acute angle relative to the first surface, the vibration generator being mounted on the second surface, the vibration transmitting member having a hardness, the vibration transmitting member being configured to generate surface waves that advance in a predetermined direction in the exterior member, wherein the vibration generator comprises a piezoelectric element, and the vibration transmitting member is formed of a resin material.

2. The adhering substance removing device according to claim 1, further comprising:
   a liquid retaining member that is in contact with or in adjacent to the vibration transmitting member, the liquid retaining member being configured to retain liquid in contact with a surface of the exterior member.

3. The adhering substance removing device according to claim 2, wherein the vibration generator, the vibration transmitting member, and the liquid retaining member are accommodated in a window frame provided on a circumferential portion of the window.

4. The adhering substance removing device according to claim 3, wherein the liquid retaining member is provided on a door outer molding provided on an upper end portion of the door.

5. The adhering substance removing device according to claim 3, wherein the liquid retaining member is provided inside a sash configured to hold an edge of the door window when the door window is completely closed.

6. The adhering substance removing device according to claim 5, further comprising:
 a passage configured to guide the liquid from a region separated from the liquid retaining member in the sash to the liquid retaining member.

7. The adhering substance removing device according to claim 2, the liquid retaining member is provided on a door outer molding provided on an upper end portion of the door.

8. The adhering substance removing device according to claim 2, the liquid retaining member is provided inside a sash configured to hold an edge of the door window when the door window is completely closed.

9. The adhering substance removing device according to claim 8, further comprising: a passage configured to guide the liquid from a region separated from the liquid retaining member in the sash to the liquid retaining member.

10. The adhering substance removing device according to claim 2, wherein the vibration transmitting member is disposed such that the direction of the generated surface waves coincides with or is approximately parallel to a direction of travel wind that flows around the vehicle body during traveling.

11. The adhering substance removing device according to claim 1, wherein a part of a liquid is retained between the vibration transmitting member and the exterior member.

12. The adhering substance removing device according to claim 11, wherein the vibration generator, the vibration transmitting member, and a liquid retaining member are accommodated in a window frame provided on a circumferential portion of the window.

13. The adhering substance removing device according to claim 11, a liquid retaining member is provided on a door outer molding provided on an upper end portion of the door.

14. The adhering substance removing device according to claim 3, a liquid retaining member is provided inside a sash configured to hold an edge of the door window when the door window is completely closed.

15. The adhering substance removing device according to claim 14, farther comprising: a passage configured to guide the liquid from a region separated from the liquid retaining member in the sash to the liquid retaining member.

16. The adhering substance removing device according to claim 11, wherein the vibration transmitting member is disposed such that the direction of the generated surface waves coincides with or is approximately parallel to a direction of travel wind that flows around the vehicle body during traveling.

17. The adhering substance removing device according to claim 1, wherein the vibration transmitting member is disposed such that the direction of the generated surface waves coincides with or is approximately parallel to a direction of travel wind that flows around the vehicle body during traveling.

* * * * *